Sept. 6, 1938.          W. DUBILIER          2,128,990
ELECTRICAL CONDENSER
Filed Sept. 26, 1931
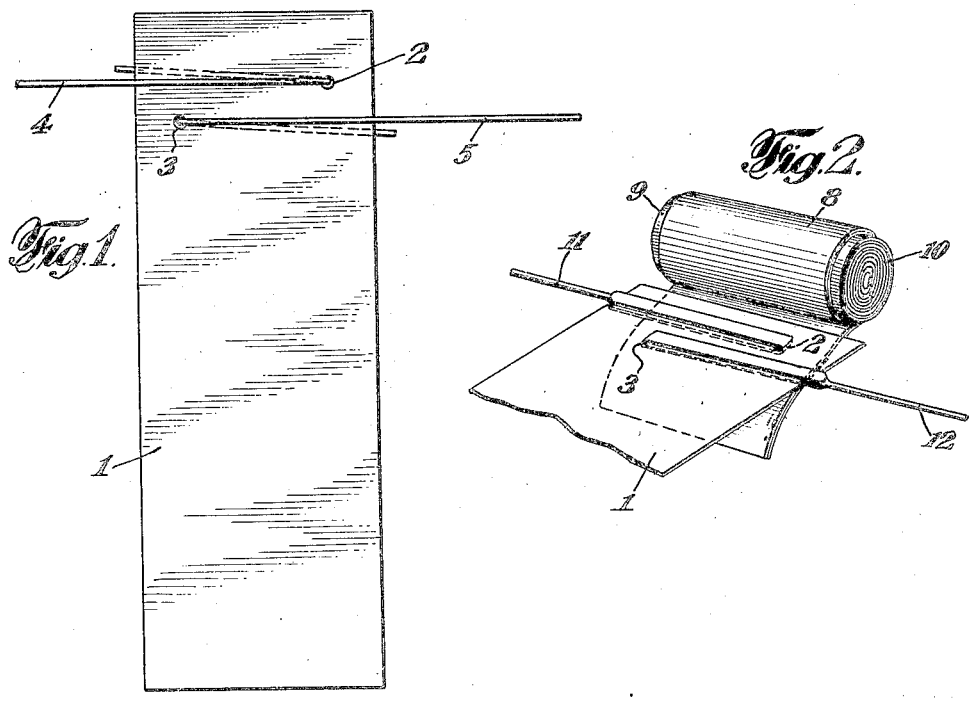
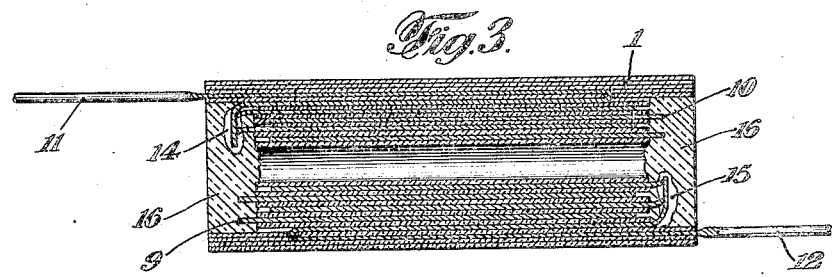
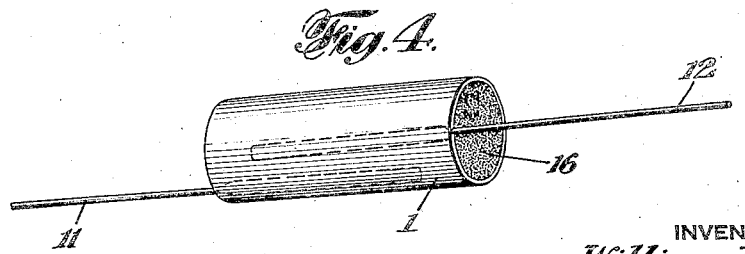
INVENTOR
*William Dubilier*
BY
*Edwards, Bower & Pool*
ATTORNEYS Patented Sept. 6, 1938

2,128,990

UNITED STATES PATENT OFFICE 2,128,990

ELECTRICAL CONDENSER

William Dubilier, New Rochelle, N. Y., assignor to Dubilier Condenser Corporation, New York, N. Y., a corporation of Delaware Application September 26, 1931, Serial No. 565,213

15 Claims. (Cl. 175—41)

The present invention relates to improvements in electrical condensers and more particularly to the type known as rolled condensers.

It has been customary, in the manufacture of electrical condensers, first to prepare a condenser body of interposed sheets of paper and foil, usually by winding or rolling long sheets or strips into a compact body. The condenser body is then impregnated with a suitable insulating substance such as paraffin or oil. After impregnation terminals are attached to the foils of the condensers, usually by soldering. Attempts have been made to support such condensers by their terminals but the strain thereby imposed on the soldered joints often causes breakage or tearing out of the foils. A protective casing is sometimes provided for the condenser body, which casing may be wound over the body and the terminals attached to the casing, as disclosed and claimed in my United States Patent No. 1,768,441, issued June 24, 1930. In such condensers the strains on the terminals are relieved by the casing.

I have discovered that, if excessive heat is used for soldering the terminals to the foils, such as is likely to occur in practice, the insulating properties of the impregnating material are impaired. This is probably due to the formation of fatty acids within the condenser, especially if the impregnating substance has a paraffin base.

It is, therefore, an object of this invention to prevent such impairment of the insulating value of the condenser. This object is accomplished by soldering the terminals to the foils before impregnating the condenser.

Another object of this invention is to provide a condenser with very simple and cheap terminals which may be severely strained without injury to the connections between the terminals and the foils.

The latter object is accomplished by forming a condenser body of interposed sheets or layers of insulation and foil, either by rolling up long strips of said materials or in any other suitable manner, providing the condenser body with a wrapping of insulation, winding terminals into the condenser with the wrapper as it is applied to the condenser body in such manner that the terminals are securely held by the wrapper, and then soldering the terminals to the respective foils.

With the terminals thus secured and soldered the condenser may be impregnated and waxed and other operations performed thereon or therewith without danger of breaking the soldered connections or of losing the terminals. The terminals may have sufficient length of a sufficiently small cross-section so that, when connecting the condenser into a circuit by soldering the terminals to some part of the circuit, the temperature of the condenser body will not be raised sufficiently to impair its insulation.

Other objects and advantages of the present invention will be apparent as the description proceeds when read in connection with the appended drawing which forms a part of this specification, and in which, Fig. 1 shows a wrapper for a condenser body in accordance with this invention;

Fig. 2 illustrates how such a wrapper may be wound into a condenser body;

Fig. 3 shows an enlarged section through the center of a finished condenser made in accordance with this invention; and Fig. 4 is a perspective view of a complete condenser in accordance with this invention.

Referring now to the figures of the drawing in detail, in Fig. 1 reference character 1 indicates a strip of insulation, such as heavy paper, suitable for a wrapper for a condenser body and having perforations 2 and 3 therein, preferably near one end of the strip. Terminals 4 and 5, of wire or strip or other conductive material, are passed through the perforations 2 and 3 respectively, the said terminals being bent back upon themselves hairpin fashion so that one leg of each terminal is longer than the other leg. The shorter leg extends preferably from the perforation to or near the edge of strip 1.

In Fig. 2 reference character 8 represents a condenser body comprising alternate sheets of foil and insulation, such as condenser tissue, which have been rolled to the extent that the ends of the foils are within the roll but end portions of the condenser tissues extend from the roll as shown. Reference characters 9 and 10 indicate the edges of the foils extending from opposite ends of the roll or condenser body 8 in the usual manner. (A more detailed description of the rolling of a condenser body may be found in Patent No. 1,768,441, above mentioned.) A wrapper 1, such as shown in Fig. 1, is shown inserted between the extending portion of the condenser tissues and the body of the condenser, the wrapper being provided with terminals 11 and 12 which are similar to terminals 4 and 5 of Fig. 1, but in Fig. 2 these terminals are shown as being flattened where they contact with the wrapping strip. With the end of wrapper 1 thus inserted the rolling of the body 8 is continued so that the wrapper and terminals are wound into the condenser, the said wrapper being preferably of such length that it may be wrapped around the condenser body several times. Terminals 4 and 5 of Fig. 1 and 11 and 12 of Fig. 2 are preferably tinned before incorporating them in the condenser, to facilitate subsequent soldering operations.

A cross section of a rolled condenser having a wrapper and terminals as described, is shown in Fig. 3. This figure shows clearly how the U-shaped terminals 11 and 12 may be held in place by the wrapper 1 and anchored within the turns thereof. The short ends of strips 11 and 12 may be bent toward the projecting foil edges 9 and 10 and soldered thereto, as indicated at 14 and 15 respectively. With previously tinned terminals very little additional solder is needed.

At this point in the process of manufacture, the condenser is complete except that the tissues alone provide the insulation. To protect the condenser and increase the insulation thereof, it is impregnated with a suitable insulating material, such as wax or oil, in the usual manner. It should be noticed, however, that condensers made in accordance with this invention are impregnated with the wrapping in position and the terminals securely anchored and electrically connected to the foils. After impregnation, the condensers may be further protected by dipping in wax and the ends of the condenser may be filled with a hard wax or other insulating material as indicated at 16. If desired, the whole condenser may be dipped in an insulating compound which hardens at normal temperatures.

The terminals of the condenser illustrated in Fig. 3 are disposed diametrically opposite each other relative to the condenser body. In Fig. 4 the terminals are separated only a small distance so that they lie on the same side of the condenser. If it is desired to have the projecting part of the terminals exactly in line they may be offset within the condenser or the hairpin portions of the terminals may be made shorter than one-half the width of the strip 1 whereby they may be inserted in the strip in alignment with each other.

From the foregoing description, it is believed that persons skilled in the art will appreciate the advantages of the condenser construction disclosed herein and the method of making such condensers. The terminals, being anchored to the wrapper and preferably passing through the wrapper as illustrated, are securely held in proper relation to the condenser body and any bending or other strains placed upon the long ends of the terminals will not be transmitted to the short ends of the terminals which are soldered to the foils. It is possible, therefore, to pass the condensers through the operations of impregnation, etc. without damaging the terminals or foils. In the completed condenser, it is practically impossible to break the soldered joints between the foils and the terminals by twisting or pulling the ends of the terminals which project from the condenser and by which circuit connections to the condenser may be made.

The embodiment of the invention illustrated and described herein has been selected for the purpose of clearly setting forth the principles involved. It will be apparent however, that the invention is susceptible of being modified to meet different conditions encountered in its use and it is therefore intended that the appended claims cover all modifications within the true spirit and scope of the invention.

What I claim is:—

1. A rolled condenser comprising a compact body of rolled up strips of foil and insulation, a protective wrapper for said body, and a plurality of wire terminals passing through a fold of said wrapper, each of said terminals being bent upon itself and wound into the condenser with the wrapper.

2. A condenser comprising a body of interposed layers of foil and insulation, a casing for said body formed by wrapping a strip of insulating material around said body, and a pair of U-shaped wire terminals passing through perforations in said strip and wrapped with the strip, each terminal having one leg thereof soldered to a foil of said condenser and the other leg thereof extending beyond the condenser body.

3. A wrapper for a condenser body comprising a strip of insulation adapted to be wound around said body with a plurality of turns, and a U-shaped terminal having portions thereof disposed on opposite sides of said strip substantially in the plane thereof, said portions being adapted to be held by and between turns of said strip.

4. A terminal for a condenser body having a foil exposed at an end thereof and a wrapper wound thereon, comprising a wire having one end electrically connected to said foil, the other end projecting from said wrapper, and an intermediate portion securely held between turns of said wrapper.

5. A terminal for a condenser body having a foil exposed at an end thereof and an outer covering of insulation, comprising a wire having an end portion thereof spread to provide an enlarged contact area, said wire engaging the insulation covering and being anchored onto said casing and the spread end engaging the exposed foil, the opposite end portion of the wire projecting wholly outside the condenser body and being flexible in any direction whereby said casing absorbs any mechanical stress between said wire and foil.

6. An electrical condenser comprising two metal foils and interposed layers of insulating material wound into a roll, a terminal wire joined to each of said foils, a wrapper surrounding said roll, said terminal wires projecting thru said wrapper, and means to prevent mechanical stress to be exerted on the joint between said terminal wires and said foils.

7. An electrical condenser comprising two metal foils and interposed layers of insulating material wound into a roll, a terminal wire joined to each of said foils, a wrapper surrounding said roll, said terminal wires projecting thru said wrapper and being provided with a bend below the wrapper to prevent mechanical stress to be exerted on the joint between said terminal wires and said foils.

8. The combination with a condenser body comprising metallic layers insulated by dielectrics and an outer insulating enclosure therefor, of wire terminals each having an end portion in electrical connection with a metallic layer and permanently and tightly anchored to said insulating enclosure to prevent mechanical stress being exerted on the electrical connection between the said end and metallic layer, the opposite end portions of said termnals projecting outside of said insulating enclosure, said stress being absorbed by said enclosure.

9. An electrical condenser comprising two metal foils and interposed layers of insulating material wound into a roll, insulating enclosure means tightly surrounding the condenser body, terminal means electrically joined to the ends of the respective foils and being tightly and permanently anchored to said enclosure means to prevent mechanical stress to be exerted on the joint between said terminal means and foil.

10. A wrapper for a condenser body comprising a strip of insulation adapted to be wound around said body with a plurality of turns, and a one-piece conducting device passing through an opening in said strip and having a portion thereof adapted to be securely held within the turns of said strip and another portion thereof extending beyond a long edge of said strip.

11. A terminal for a condenser body having a foil exposed at an end thereof and a protective insulating casing, said terminal comprising a wire having one end electrically connected to said foil, the other end projecting through said casing, and an intermediate portion anchored within said casing so that the casing resists strains from the projecting end and prevents their transmission to the said foil connection.

12. A condenser comprising a plurality of layers of metal foil and dielectric forming a condenser body having conductive continuations of the foils projecting from the ends, a protective insulating tubular casing surrounding said body, and terminal leads electrically connected to said conductive continuations for connecting the condenser to a circuit, said terminal leads being anchored to the casing to prevent mechanical strains being transmitted to the junction points of the leads and condenser body.

13. A condenser comprising a plurality of layers of metal foil and dielectric forming a condenser body having conductive continuations of the foils projecting from the ends, a protective insulating tubular casing surrounding said body and projecting beyond the ends thereof, terminal leads electrically connected to said conductive continuations for connecting the condenser to a circuit, said terminal leads being anchored to the casing to prevent mechanical strains being transmitted to the junction points of the leads and condenser body, and a filling of insulating compound in the ends of said condenser and casing.

14. A condenser comprising a first and second metal foil layer and interposed insulation layers forming a condenser body, a protective casing about said condenser body, a first terminal lead connected to said first foil layer, a second terminal lead connected to said second foil layer, said terminal leads being secured to said casing whereby said casing absorbs mechanical stresses on the leads to prevent dislocation of their connections to the foils.

15. A condenser comprising a first and second metal foil layer and interposed insulation layers forming a condenser body, said layers being laterally displaced so that corresponding opposite edges thereof project beyond the condenser body, a protective casing about said condenser body, a terminal wire individual to each of said foil layers, one end of each of the terminal wires being electrically joined with a corresponding foil layer at a protruding portion thereof, an intermediate portion of each terminal wire being rigidly secured to said casing whereby said casing absorbs mechanical stresses on the wires to prevent mechanical injury to the electrical connection, and the opposite end of each wire projecting beyond the casing to effect external electrical connection for the condenser foil layers.

WILLIAM DUBILIER.